(12) United States Patent
Oglesbee et al.

(10) Patent No.: US 8,659,263 B2
(45) Date of Patent: Feb. 25, 2014

(54) POWER SUPPLY CIRCUIT HAVING LOW IDLE POWER DISSIPATION

(75) Inventors: John W. Oglesbee, Watkinsville, GA (US); Michael D. Geren, Suwanee, GA (US); Dipti V. Desai, Lawrenceville, GA (US); John E. Herrmann, Suwanee, GA (US)

(73) Assignee: Motorola Solutions, Inc., Schaumburg, IL (US)

( * ) Notice: Subject to any disclaimer, the term of this patent is extended or adjusted under 35 U.S.C. 154(b) by 564 days.

(21) Appl. No.: 12/959,585

(22) Filed: Dec. 3, 2010

(65) Prior Publication Data

US 2012/0139477 A1    Jun. 7, 2012

(51) Int. Cl.
*H02J 7/00* (2006.01)
*H01H 47/00* (2006.01)

(52) U.S. Cl.
USPC ............................ 320/107; 320/137; 307/130

(58) Field of Classification Search
USPC .................................. 320/107, 137; 307/130
See application file for complete search history.

(56) References Cited

U.S. PATENT DOCUMENTS

| 6,081,096 | A * | 6/2000 | Barkat et al. ................ 320/124 |
| 6,605,926 | B2 | 8/2003 | Crisp et al. |
| 7,576,514 | B2 * | 8/2009 | Hui ............................. 320/108 |
| 7,728,558 | B2 | 6/2010 | Tam et al. |
| 7,755,330 | B2 | 7/2010 | Vieira Formenti et al. |
| 8,125,189 | B2 | 2/2012 | Formenti |
| 2004/0232878 | A1 * | 11/2004 | Couch et al. ................ 320/101 |
| 2006/0232244 | A1 | 10/2006 | Vieira Formenti et al. |
| 2009/0295469 | A1 * | 12/2009 | DuBose ....................... 327/544 |
| 2011/0089898 | A1 * | 4/2011 | Lee et al. ..................... 320/116 |
| 2011/0128153 | A1 * | 6/2011 | Sims et al. ................ 340/636.1 |
| 2011/0128253 | A1 * | 6/2011 | Yoon et al. ................... 345/174 |
| 2011/0309802 | A1 * | 12/2011 | Hoffman et al. ............. 320/163 |
| 2012/0001596 | A1 | 1/2012 | Meyer et al. |
| 2012/0133324 | A1 | 5/2012 | Baarman et al. |

OTHER PUBLICATIONS

Power Integrations, "Reference Design Report for 2.4 W Charger Using LNK603DG," Document RDR-159, Oct. 2, 2008, pp. 40.

Power Integrations, "Reference Design Report for a 35 W Power Supply Using TOP258PN," Document RDR-142, Dec. 7, 2007, pp. 40.

Power Integrations, "TOP252-262 TOPSwitch-HX Family," Jan. 2009, pp. 48.

\* cited by examiner

*Primary Examiner* — Drew A Dunn
*Assistant Examiner* — Nathaniel Pelton
(74) *Attorney, Agent, or Firm* — Barbara R. Doutre

(57) ABSTRACT

Embodiments include a power supply arrangement where major components including an off-line switched power supply are shut off when not in use. When a load is coupled to the power supply arrangement, components are enabled so as to provide power to the load.

20 Claims, 4 Drawing Sheets

POWER SUPPLY CIRCUIT HAVING LOW IDLE POWER DISSIPATION

FIELD OF THE INVENTION

The invention relates generally to power control circuits, and more particularly to controlling operation of a power control circuit so as to minimize standby power dissipation when not providing power to a load.

BACKGROUND OF THE INVENTION

Electrical power circuits are used to convert standard alternating current (AC) service to a form usable by devices, and to regulate the amount of power provided in response to demand by electrical and electronic devices being powered by the power circuit. It is not uncommon for a device to be in a standby mode, where it is coupled to an AC source, but not operating in an active mode and providing power to some device or load (other than itself). It is common to leave electrical and electronic devices plugged into an AC source even while not in use so that the device is ready to operate. When plugged into an AC source the main power circuitry is powered. As a result, the device dissipates power at the main power converter circuitry.

Numerous examples of such devices exist, including, for example, televisions and other audio/visual equipment, appliances, and so on. One type of device that falls into this category is battery chargers. Many types of battery charges are designed to be left plugged into AC service so that a battery can simply be dropped into the charger and recharged without the user having to plug the charger into the AC source. For example, some organizations use communication devices to allow members to communicate with each other. Examples of such organizations include police, fire, and other public safety organizations. It is common for an organization member to place their communication device into a charger upon returning to an office or other facility. Accordingly, battery chargers commonly used by such organizations have multiple pockets to be able to receive multiple batteries or devices so that they can be charged at the same time.

A typical battery charger for rechargeable batteries that recharges battery at a rapid rate (typically about an hour for a fully discharged battery) contains a main power converter that converts the AC source power to a direct current (DC) level which is typically further regulated by a buck-type converter, as controlled by charge control circuitry which regulates current and voltage applied to the battery according to a charge regime which depends on the battery chemistry and desired rate of charge. The use of a buck regulator on the secondary side of the power supply to charge a battery has two functions. First, in multiple pocket chargers, where each pocket can be used to receive and charge a battery, each pocket can have its own dedicated buck regulator which is fed from the output of the main power converter. Furthermore, a buck regulator can prevent improper operation of the main power converter should the charging contacts be short circuited, as can happen accidently when some foreign object becomes placed in the pocket, or if the battery is defective.

However, when both a main power converter and a buck regulator are used, the inefficiencies of the two regulators are multiplied. Furthermore, in multi-pocket chargers, the main power converter has to be designed to support maximum electrical output when all pockets are charging, which typically means when only one pocket is being charged the main power converter is not operating at peak efficiency. During standby, even though the power converter is supplying less power, it typically has an even worse efficiency, which is why power adapters continue to dissipate considerable heat even in standby.

Therefore there exists a need for a power control circuit that addresses these and other issues associated with known power circuit configurations.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Embodiments of the invention reduce the standby power dissipation of power supply circuits and other power supply arrangements by recognizing when a load is presented to the power supply and when a load is absent. When there is no load present, the power supply shuts off most portions of circuitry, including the main off-line power supply components. An ultra-low power auxiliary power supply remains on to provide enough power to detect the presence of load and to power a management circuit which is responsive to the detection of a load. The ultra-low power auxiliary power supply is designed to provide on the order of a 100 milliwatts or less. Once the load is detected, the management circuit enables or otherwise turns on other power supply components to provide power to the load. The power level required by the power supply circuitry is much lower than the power level required by the load. Accordingly, the main power supply, being designed to provide power to the load, can be optimized for efficiency over a power range typically required by loads. Since the main power supply is shut off when there is no load present, it does not provide standby power to the power supply circuitry, which would result in relatively inefficient operation. The auxiliary power supply is optimized to efficiently power the power supply circuitry needed to maintain standby operation, and detect when a load is presented (electrically coupled) to the power supply output.

Figure 1:
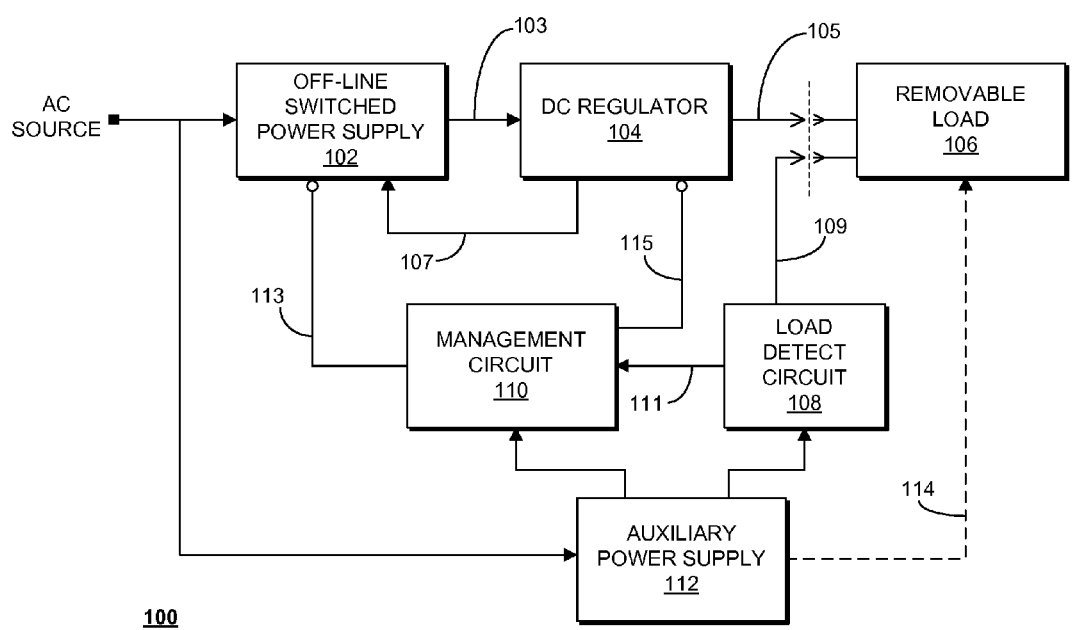
FIG. 1 shows a block schematic diagram of a power supply arrangement in accordance with an embodiment.

Referring to FIG. 1, there is shown a block schematic diagram of a power supply arrangement 100 in accordance with an embodiment. The power supply arrangement includes an off-line switched power supply or power converter 102. By "off-line" it is meant that the power supply 102 is coupled to a conventional AC line power source, such as an AC residential power outlet, and the power supply is therefore said to be powered off the line, or "off-line." As is well known, an off-line power supply, such as power supply 102, typically includes a rectifier bridge and bulk capacitor to convert the AC source into a DC level. The DC level is typically switched through the primary side of a transformer to provide a lower DC level output 103 on the secondary side of the transformer. A DC regulator 104 regulates an output 105 of the power supply arrangement provided to a removable load 106. The removable load 106 can be electrically removable, either by being switched on/off, or by physically removing the load from being connected to the output. The DC regulator can comprise a feedback circuit which provides feedback 107 to the off-line switched power supply 102. In at least one embodiment the DC regulator 104 can be included in the secondary-side circuitry of the off-line switched power supply 102, where the output 103 substantially feeds through to the output 105, and circuitry on the primary side of the off-line switched power supply 102, responsive to the feedback 107, adjusts operation to maintain the output 103/105 at the prescribed electrical parameters. Accordingly, the DC regulator 104 can regulate output voltage, output current, or both, as is known. In at least one alternate embodiment, the off-line switched power supply 102 provides a constant voltage at output 103, and DC regulator 104 regulates an output 105 from the output voltage 103. For example, the DC regulator can comprise a step-down buck regulator which regulates an output voltage, current, or both to the load 106. The DC regulator 104 can regulate the output 105 to maintain a constant output, or it can apply power to the removable load 106 responsively to the load, or according to a prescribed regime such as a battery recharging regime.

The off-line switched power supply 102 can be any one of a variety of known switching power supply topologies, including flyback, full bridge, half bridge, and resonant power converter topologies. The off-line switched power supply 102 is further controllable to either an "on" state or an "off" state. In the "on" state the off-line power supply 102 operates normally, providing power from the AC source to an output on the secondary side 103. In the "off" state the off-line switched power supply 102 is substantially non-functional, and draws substantially no power from the AC source. Accordingly, when in the "off" state, there is no electrical output at the output 103. Similarly the DC regulator 104 is controllable to either an "on" state or an "off" state. In the "on" state the DC regulator 104 operates to regulate the output 105 to a prescribed level, and in the "off" state the DC regulator 104 draws substantially no power.

To determine when to turn the off-line switched power supply 102 and DC regulator 104 on and off, a load detection circuit 108 is used to sense the presence of the removable load 106. When the removable load is present, meaning that it is electrically coupled to the output 105, the electrical state of a sense line 109 changes, and causes the load detection circuit 108 to output a load detect signal 111. The load detect signal 111 is provided to a management circuit 110. The management circuit 110 can be controllable to either an "on" state or an off or low power state, although it is contemplated that a simple switching circuit can be used that is responsive to the load detect signal and which further enables the off-line switching power supply 102 and DC regulator 104 via enable signal lines 113, 115, respectively. Initially, when no load 106 is present, the management circuit 110 is in the low power state to minimize its power consumption. Responsive to the load detect signal 111 being asserted to the management circuit 110, however, the management circuit 110 can wake up from the low power state to the "on" state where it is operational. In at least some embodiments the management circuit 110 can include a microprocessor or microcontroller and the load detect signal 111 can generate an interrupt event at the microcontroller to cause it to wake up and provide enablement signals to the off-line switching power supply 102 and DC regulator 104. Furthermore, in embodiments including a microcontroller, the microcontroller can be configured with instruction code for supervising the DC regulator operation according to a prescribed power output regime, such as a battery recharging regime.

The removable load 106 can be detected by any of a variety of techniques. In one embodiment the removable load 106 can be a rechargeable battery that provides a battery voltage which can be detected via sense line 109. In other embodiments the removable load 106 can include an electrical interface which interacts with a corresponding interface component of the power supply arrangement 100 that is coupled to sense line 109 and which modifies an electrical parameter of the sense line 109. For example, the sense line 109 can provide a DC voltage output level which, when the removable load 106 is coupled to the power supply arrangement 100 changes the DC voltage level on sense line 109. The sense line 109 can be dedicated to allowing detection of the removable load 106, or it can used for additional purposes. For example, the sense line 109 can be used to obtain information data, sensing other characteristics such as temperature, and so on.

The auxiliary power supply 112 can provide power to the load detection circuit 108 and management circuit 110 from the AC source and can be an ultra-low power switching power supply optimized to supply on the order of 100 milliwatts (mW) or less, and can achieve an efficiency of approximately 85%. When the rechargeable load 106 is not present, the auxiliary power supply 112 can provide power only to the load detect circuit 108 and management circuit 110 sufficient to allow detection of the removable load 106 being coupled to the output 105. Power supplied by the auxiliary power supply 112 is used by the detection circuit 108 to detect the removable load 106 upon the removable load 106 being coupled to the output 105. Furthermore, the management circuit 110 can require a small amount of power to operate in a low power or sleep state while still being responsive to the load detection signal 111. The auxiliary power supply 112 can continue to provide power to load detection circuit 108 and management circuit 110 while the removable load is being powered. In embodiments where the removable load 106 is a rechargeable battery, once the power supply has charged the rechargeable battery to a substantially charged state, or to some other point where the output 103 of the off-line power supply is no longer needed, the auxiliary power supply 112 can be configured to provide maintenance charge power 114 to the rechargeable battery.

Figure 2:
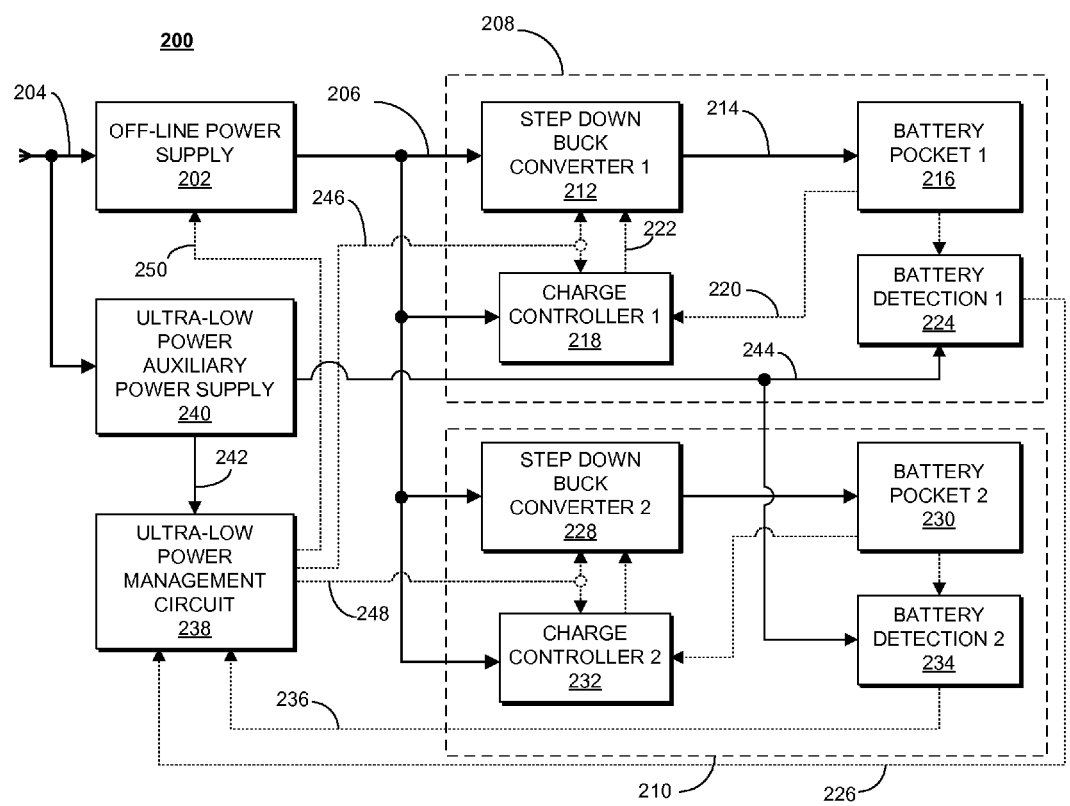
FIG. 2 shows a block circuit schematic of a multi-load power control circuit in accordance with an embodiment.

FIG. 2 shows a block circuit schematic of a multi-load power control circuit 200 in accordance with an embodiment. In the present exemplary embodiment, the multi-load power control circuit can be a multi-pocket rechargeable battery charger. In a multi-pocket battery recharger there are multiple pockets for recharging rechargeable batteries separately and individually. Each pocket provides an electrical and mechanical interface for coupling to a rechargeable battery having a corresponding interface and form factor design. Typically the mechanical features of a pocket include electrically conductive metallic contacts that can be sprung or cantilevered and are configured to make contact with corresponding electrical contacts on a rechargeable battery designed to fit into the pocket.

The multi-load power control circuit 200 includes an off-line switched power supply 202, which can be substantially identical to the off-line switched power supply of FIG. 1. The off-line switched power supply 202 receives electrical power from and AC source 204, such as a common household electrical outlet, and provides a regulated output 206. The regulated output 206 is a shared output and is proved to each pocket circuit, such as pocket circuits 208, 210. Each pocket circuit is substantially identical, and comprises a DC regulator such as a step down buck converter 212, 228, a battery pocket 216, 230, charge controller 218, 232, and a battery detection circuit 224, 234. Each step down buck converter 212, 228 is controllable to either an on or an "off" state. In the "on" state it regulates the shared DC 206 down to a lower DC level 214, and in the "off" state it provides no output and draws substantially no power. Similarly, each charge controller 218, 232 is controllable to either an "on" state or an "off" state. The charge controllers 218, 232 control operation of their respective step down buck converters 212, 228 to provide charging current and voltage 214 to a battery in its respective pocket 210, 230 via a control signal 222. The charge controller receives charging information 220 from the rechargeable battery while it is being charged, such as voltage and/or temperature, depending on the type of battery being recharged. Each step down buck regulator 212, 228 and its respective charge controller 218, 232 operate substantially as the DC regulator 104 of FIG. 1. Each battery detection circuit 224, 234 operates substantially the same as load detect circuit 108 of FIG. 1.

When a battery is placed in a pocket 216, 230 the corresponding battery detection circuit 224, 234 produces a battery detection signal 226, 236 to an ultra-low power management circuit 238. The ultra-low power auxiliary power management circuit 238 operates substantially similar to management circuit 11 of FIG. 1. Upon assertion of any of the battery detection signals 226, 236, the ultra-low power management circuit in response asserts an enable signal 246, 248 to the corresponding pocket circuit 208, 210. The enable signal 246, 248 turns on the step down buck converter 212, 228 and charge controller 218, 228 in the corresponding pocket circuit 208, 210. Furthermore, the ultra-low power management circuit 238 controls the off-line switched power supply 202 via an enable signal 250.

When there are no batteries in any of the pockets 216, 230, the off-line switched power supply 202, step down buck regulators 212, 232, charge controllers 218, 232, and the ultra-low power management circuit 238 are each in their respective off or low power state and draw only a negligible amount of power. An ultra-low power auxiliary power supply 240 supplies power to the battery detection circuits 224, 234 via line 244, and to the ultra-low power management circuit 238 via line 242. In the present example the charge controllers 218, 232 are shown as being powered by the shared DC 206 output by the off-line switched power supply 202, but it is contemplated that these components could alternatively be powered by the ultra-low power auxiliary power supply 240.

When there is no battery in any of the pockets 216, 230, and a battery is placed in any one of the pockets 216, 230, the corresponding battery detection circuit 224, 234 produces a battery detect signal 226, 236. The battery detect signal is substantially similar to the load detect signal 111 of FIG. 1. Responsive to the battery detect signal, the ultra-low power management circuit 238 changes from a low power state to an on or active state and enables the corresponding pocket circuit 208, 210 and the off-line switched power supply 202. In response, the off-line switched power supply begins providing the shared DC level 206, and the step down buck converter 212, 228, as controlled by a charge controller 218, 232, begins charging the battery that been placed in the pocket 216, 230. If another battery is placed in the other pocket, the corresponding battery detection circuit will generate a battery detect signal to the ultra-low power management circuit 238, which in turn enables the corresponding pocket circuit to commence charging the additional battery. The off-line switched power supply will already be on since the first battery is being charged, so the shared DC level 206 will be available to charge the additional battery. Since each pocket circuit 208, 210 (or additional pockets) can be placed in a low power state while not in use, idle power dissipation is minimized.

Figure 3:
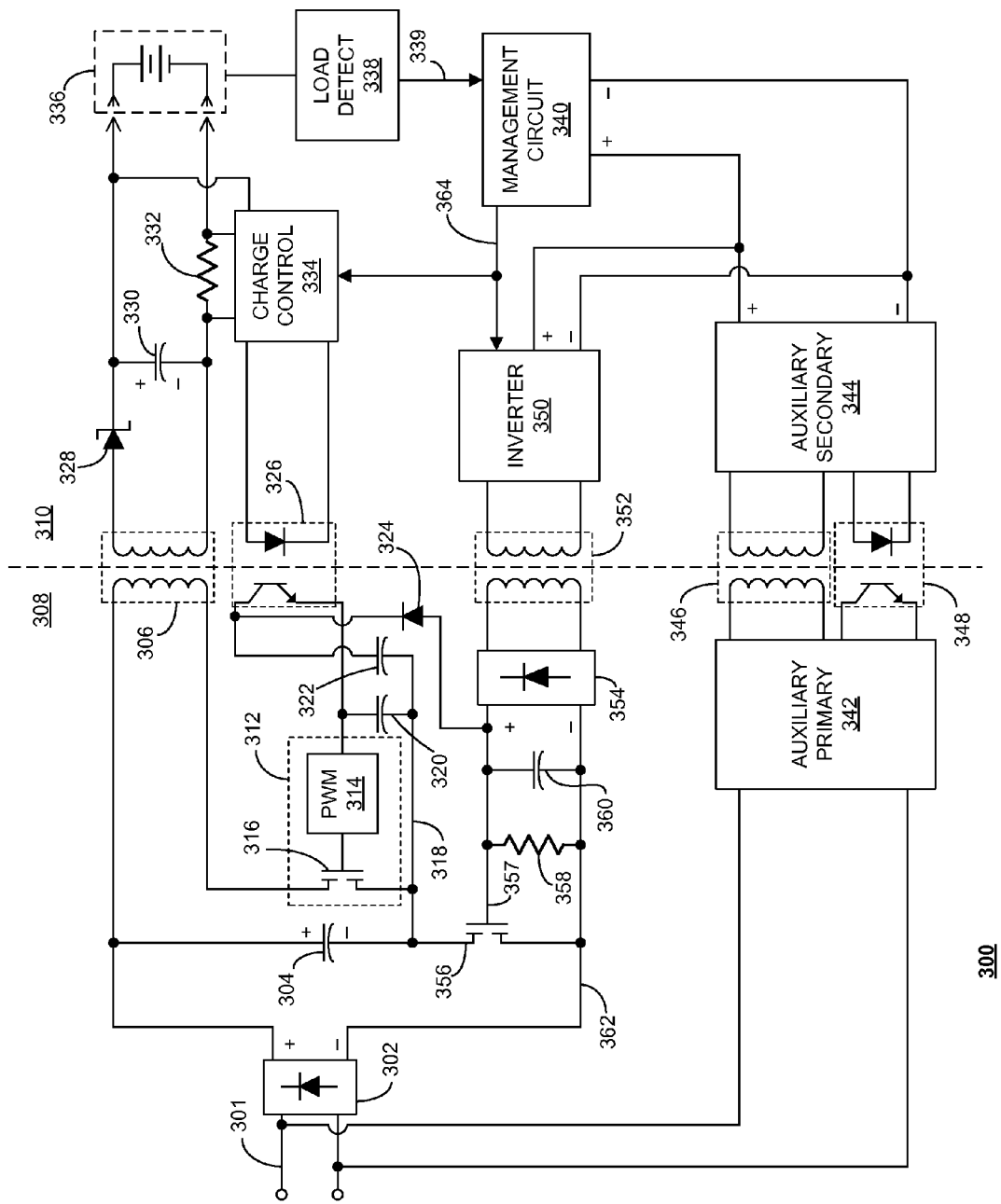
FIG. 3 shows a circuit schematic of power control circuit in accordance with an embodiment.

FIG. 3 shows a circuit schematic of power control circuit 300 in accordance with an embodiment which is an example of an arrangement where the DC regulator provides control feedback to the off-line switched power supply to control output to the load. AC power from an AC source 301 is first rectified by a main bridge rectifier 302 and the rectified output of the main bridge rectifier 302 is filtered by a bulk capacitor 304. A transformer 306 defines a primary side 308 and a secondary side 310 of the off-line switching power supply. Current is switched through the primary side of the transformer by a switch controller 312 which includes a transistor switch 316 that can be switched on and off with an adjustable duty cycle by a pulse wave modulator 314. The bulk capacitor 304 and switch 316 are coupled to a common node or line 318, which is in turn switchably coupled to the negative output 362 of the input bridge rectifier 302 through a control switch transistor 356. Control of the PWM 314 is accomplished by feedback received from circuitry on the secondary side 310 via an opto-coupler 326. The output of the opto-coupler on the primary side 308, which is filtered by capacitor 320, drives the duty cycle of the PWM 314. Bias is provided to the primary side of the opto-coupler 326 from diode 324, which is filtered by capacitor 322. Along with elements on the secondary side 310 of the transformer 306, the off-line switched power supply includes the input bridge rectifier 302, bulk capacitor 304, transformer 306, switch controller 312, and opto-coupler 326. The off-line switched power supply is controllable to an "on" or an "off" state by switch 356. When switch 356 is closed, i.e. in a very low resistance state, the common node 318 is at substantially the same voltage level as the negative output 362 of the bridge rectifier 302, and the bulk capacitor 304 is charged by the bridge rectifier 302 to a high DC voltage level (when coupled to the AC source). The common node 318 and the negative output 362 of the bridge rectifier 302 are essentially shorted together through switch 356 when switch 356 is closed. When the switch 356 is opened, the common node 318 is essentially electrically disconnected from the negative output 362, and the off-line switching power supply ceases operation. When the switch 356 is open, the common node 318 can rise to a relatively high voltage level relative to the negative output 362. Diode 324 prevents damage to the gate 357 of the switch 356.

On the secondary side 310 of the transformer 306, capacitor 330 filters the output of transformer 306. A diode 328 is provided to prevent discharge of a battery when a battery remains coupled to the power supply and the power supply is shut off or unplugged from the AC source. A sense resistor 332 can be used by a charge control circuit 334 to determine the amount of electric current being sourced through the load 336 by the off-line switched power supply, and feed can be provided by the charge control circuit 334 through the opto-coupler 326. Alternatively, the charge control circuit can be replaced by a voltage control circuit which, instead of sensing output current, is regulates output voltage. The charge control circuit 334 along with the sense resistor provide the functionality of the DC regulator 104 of FIG. 1. The load 336 can be a rechargeable battery which is charged by the charge controller in accordance with a prescribed regime. The rechargeable battery can be coupled to the power supply by an interface means such as a pocket or other connector.

The presence of the load 336 is detected by load detect circuit 338, which can sense the presence of a change in a some electrical parameter at the interface to which the load is coupled to the power supply, as is known. The load detect circuit provides a load detect signal 339 to a management circuit 340. The management circuit 340 is in an "off" state when the load detect signal 339 is not present, but changes to an "on" state when the load detect signal is present, indicating the load 336 is electrically coupled to the power supply. The management circuit 340 assert an enable signal 364 to the charge controller 334 and an inverter 350. Both of which remain "off" until the enable signal 364 is asserted.

The management circuit 340 is powered by an auxiliary power supply that includes an auxiliary primary side 342, and auxiliary secondary side 344, an auxiliary transformer 346, and an auxiliary opto-coupler 348. The primary and secondary sides 342, 344 correspond respectively to the primary side 308 and secondary side 310 of the off-line switched power supply. The auxiliary power supply is also powered from the AC source. The auxiliary power supply in the present embodiment also provides power to the load detect circuit 338 (connection not shown) and the inverter 350, and is configured to provide a much lower power output level than the off-line switched power supply but operate at a relatively high efficiency, on the order of 85%, which is much higher than the efficiency that the off-line power supply would have at the same output power level. This allows power to be provided to the essential circuits while minimizing idle power dissipation while the power supply 300 is connected to the AC source.

As with other embodiments taught herein, when there is no load 336 electrically present, the off-line switched power supply is controlled to be in the "off" state; switch 356 is open (high impedance state), power switch 316 remains off, and PWM 314 is not operating. Furthermore, charge control circuit 334, management circuit 340, and inverter 350 are each in their respective "off" state. Only load detect circuit 338 and auxiliary power supply 342, 344 are on, and management circuit 340 can draw power sufficient to maintain a "sleep" or low power state in order to be responsive to the load detect signal 339. When the load 336 is coupled to the power supply 300, the load detect circuit asserts the load detect signal 339. Responsive to the load detect signal 339, the management circuit transitions to an active or "on" state, and asserts an enable signal 364. Responsive to the enable signal 364, the charge controller and inverter 350 become enabled. The inverter 350 can be an ultra-low power inverter, and has a transformer 352 having a primary side on the secondary side 310, and the inverter secondary side is on the primary side 308. The inverter 350 receives DC power from the auxiliary power supply, switches the DC power to AC form for transmission across transformer 352, where it is rectified by inverter rectifier 354 and filtered by inverter capacitor 360, thereby providing a DC level to gate 357 of switch 356, causing the switch 356 to electrically close, and electrically connecting the common node 318 to the negative output 362 of bridge rectifier 302, which causes the off-line switched power supply to commence operating. The charge control circuit 334 can be powered by the off-line switched power or by the auxiliary power supply. When the load is removed, the load detect signal 339 is de-asserted, and the management circuit, in response, de-asserts the enable signal 364, causing the charge control circuit 334 and inverter 350 to shut off, and the management circuit goes into its low power state again. When the inverter is shut off, switch 356 opens as resistor 358 bleeds off charge in capacitor 360, thereby disconnecting common node 318 from the negative output 362 of the bridge rectifier 302, causing the off-line switched power supply to cease operating.

Figure 4:
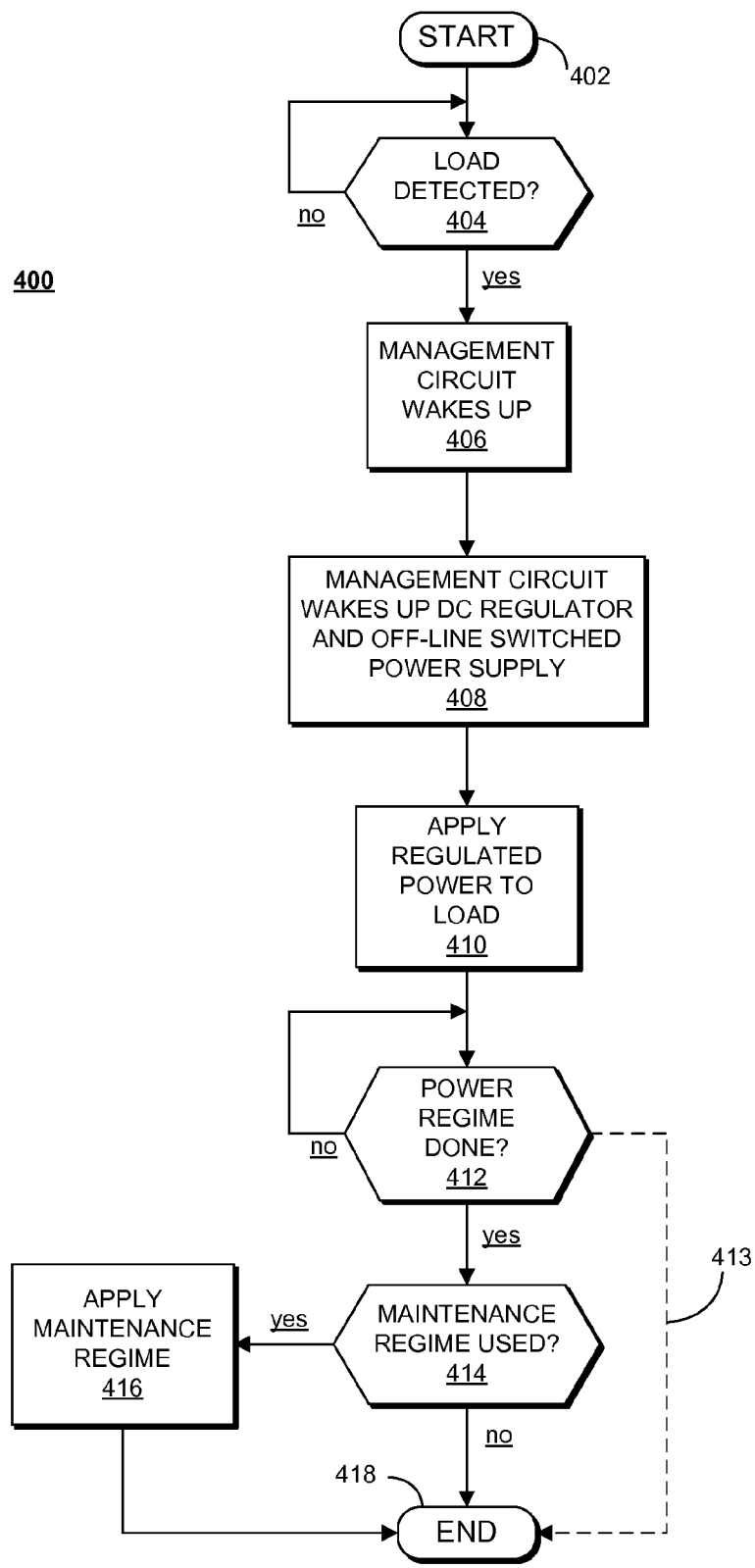
FIG. 4 shows a flow chart diagram of a method of operating a power control circuit in accordance with an embodiment.

FIG. 4 shows a flow chart diagram of a method 400 of operating a power control circuit in accordance with an embodiment. At the start 402, there is no load present. Accordingly, the method commences determining whether a load has been detected 404. When a load is detected, response to a load detect signal, the management circuit wakes up 406. The management circuit can be complex, such as including a microcontroller, or it may be very simple, such as a simple switch circuit sufficient to generate an enable signal. Responsive to the load detect signal, the management circuit wakes up the DC regulator and the off-line switched power supply 408. If the load detect signal corresponds to a particular pocket or load interface, then the DC regulator for that pocket is enabled, and other pockets that have no load can remain dormant. In at least one embodiment, the management circuit enables the off-line switched power supply indirectly, such as by an inverter. Once enabled, the power supply commences applying power to the load 410. The power applied to the load can be regulated continuously, or it can be according to a prescribed regime, such as a battery recharging regime. Accordingly, the power supply determining whether to keep applying power to the load 412. The power regime can be terminated due to requirements of the load being met, such as when recharging a battery, or it can be terminated by removal of the load, or other circumstances. If the power regime terminates due to removal of the load, then the method terminates as indicated by line 413. If the power regime is terminated due to requirements of the load being met, then there may be an optional maintenance power regime to be applied to the load 414, 416. The maintenance power regime can be, for example, trickle charging of a rechargeable battery. In some embodiments the auxiliary power supply can be used to provide the maintenance power so that the off-line switched power supply and/or the DC regulator can be shut off. Upon terminating the method 418, the DC regulator for that was regulating power to the load will be shut off. In multi-load capable embodiments, if there are no other loads being powered, then the management circuit and off-line switched power supply can also be returned to their idle states.

Accordingly, one of ordinary skill in art will recognize the embodiments of the invention can include a power supply arrangement that includes an off-line switched power supply configured to provide a regulated DC power level at an output. The power supply arrangement can further include a DC regulator circuit configured regulate the DC power level provided to a removable load coupled to the output. The power supply arrangement can further include a load detection circuit configured to provide a load detect signal when the removable load is present at the output, a management circuit responsive to the load detect signal circuit, and an auxiliary power source to provide power to the management circuit and the load detection circuit. The off-line switched power supply, the DC regulator circuit, and the management circuit can each remain in a substantially "off" state while the load detection circuit does not detect the removable load, and while the load detection circuit detects the removable load the management circuit enters an active state and causes the DC regulator circuit and off-line switched power supply to each change to an active state and provide the regulated DC level to the removable load.

One of ordinary skill with further realize another embodiment can include a multi-pocket battery charger including an off-line switched power supply, controllable between an "on" state and an "off" state, and which provides a shared DC output from an AC source when in the "on" state. The multi-pocket battery charger can further include a plurality of pocket circuits, each pocket circuit having a charge controller and a battery detect circuit, each charge controller having an "on" state and an "off" state and is configured to recharge a rechargeable battery from the shared DC output of the off-line switched power supply when in the "on" state. Each battery detect circuit can be operable to detect the presence of the rechargeable battery being coupled to the charging circuit and provide a battery detect signal while the rechargeable battery is present. The multi-pocket battery charger can further include an ultra-low power management circuit, operable in either an active state or a sleep state, which remains in the sleep state in the absence of any battery detect signal and operates in the active state responsive to at least one battery detect signal, and which enables the off-line switched power supply to the "on" state and the charge controller of each pocket circuit corresponding to the at least one battery detect signal to the "on" state when in the active state. The multi-pocket battery charger can further include an ultra-low power standby power supply which provides power from the AC source to the ultra-low power management circuit and the battery detect circuit of each pocket circuit.

A further embodiment can include a power control circuit including an off-line switched power converter controllable to either an "on" state or an "off" state responsive to a switch signal and having a transformer defining a primary side and a secondary side, the primary side configured to couple to an AC source and having a feedback receiving circuit which receives feedback from the secondary side, the secondary side configured to provide electrical output to a removable load when the off-line switching power converter is operated in the "on" state. The power control circuit can further include a regulator circuit on the secondary side of the off-line switched power converter which is controllable to either an "on" state or an "off" state responsive to an enable signal and which provides the feedback to the feedback receiving circuit to regulate the electrical output when in the "on" state. The power control circuit can further include an ultra-low power inverter having a primary side on the secondary side of the off-line switched power converter and a secondary side on the primary side of the off-line switched power converter, the ultra-low power inverter controllable to either an "on" state or an "off" state responsive to an enable signal and providing the switch signal to the off-line switched power converter when in the "on" state. The power control circuit can further include a load detection circuit on the secondary side of the off-line switched power converter responsive to the presence of the removable load and providing a load present signal when the removable load is present. The power control circuit can further include an ultra-low power management circuit on the secondary side of the off-line switched power converter controllable to either an "on" state or an "off" state responsive to the load present signal and configured to provide the enable signal to the regulator circuit and ultra-low power inverter upon turning on. The power control circuit can further include an ultra-low power auxiliary power supply having a primary side coupled to the AC source and a secondary side which provides power to the regulator circuit, ultra-low inverter, load detection circuit, and ultra-low power management circuit.

This invention can be embodied in other forms without departing from the spirit or essential attributes thereof. Accordingly, reference should be made to the following claims, rather than to the foregoing specification, as indicating the scope of the invention.

What is claimed is:

1. A power supply arrangement, comprising:
   an off-line switched power supply configured to provide a regulated direct current (DC) power level at an output;
   a DC regulator circuit configured to regulate the DC power level provided to a removable load coupled to the output;
   a load detection circuit configured to provide a load detect signal when the removable load is detected to be present at the output;
   a management circuit responsive to the load detect signal circuit; and
   an ultra-low power switching power supply powered from an AC source, the ultra-low power switching power supply to provide power to the load detection circuit to detect the presence of the removable load, and the the ultra-low power switching power supply to provide power to the management circuit, which responsive to the detection of the removable load by the load detection circuit, enters an active state and causes the DC regulator circuit and the off-line switched power supply to each change to an active state and provide the regulated DC level to the removable load;
   wherein the off-line switched power supply, the DC regulator circuit, and the management circuit each remain in a substantially "off" state while the load detection circuit does not detect the removable load.

2. The power supply arrangement of claim 1, wherein the removable load is a rechargeable battery having a battery voltage, the load detect signal is derived from the battery voltage.

3. The power supply arrangement of claim 1, wherein the removable load includes a component which interacts with the load detection circuit to produce the load detect signal.

4. The power supply arrangement of claim 1, wherein the DC regulator circuit comprises a feedback circuit that provides feedback from a secondary side to the off-line switched power supply to a primary side of the off-line switched power supply in order to regulate the power output, the power supply arrangement further comprises an ultra-low power inverter configured to provide a control signal to the primary side of the off-line switched power supply that causes the off-line switched power supply to operate in the active state, and wherein the ultra-low power inverter is controllable to either an "off" state or an "on" state response to the management circuit, and wherein the management circuit only causes the ultra-low power inverter to operate when the load detect signal indicates the removable load is present.

5. The power supply arrangement of claim 4, wherein the control signal operates a switch to electrically couple a common node of the primary side to a negative output of a rectifier bridge used to rectify the AC source, wherein the common node is reference for switching control circuitry and an input bulk capacitor on the primary side.

6. The power supply arrangement of claim 5, wherein the control signal further provides bias to a feedback circuit on the primary side.

7. The power supply arrangement of claim 1, wherein off-line switched power supply provides a shared DC output on a secondary side of the off-line switched power supply, the DC regulator circuit comprises a buck converter which regulates power to the removable load according to a prescribed regime.

8. The power supply arrangement of claim 7, wherein the prescribed regime is a battery charging regime.

9. The power supply arrangement of claim 1, wherein the off-line switching power supply is a fly back power supply.

10. The power supply arrangement of claim 1, wherein the off-line switching power supply has an operating efficiency that is substantially lower than an operating efficiency of the auxiliary power at an output power level equal to a power level required to power the management circuit and battery detection circuit.

11. The power supply arrangement of claim 1, wherein the off-line switching power supply is optimized for efficiency over a preselected range of power provided to the removable load.

12. The power supply arrangement of claim 1, wherein the removable load is a rechargeable battery, the DC regulator provides the regulated power to the rechargeable battery according to a battery charging regime to substantially recharge the battery, wherein upon the rechargeable battery being substantially recharged, the auxiliary power supply provides power to the rechargeable battery for a maintenance charge.

13. The power supply arrangement of claim 12, wherein the DC regulator and management circuit change to their respective "off" states while the rechargeable battery is receiving the maintenance charge.

14. A multi-pocket battery charger, comprising:
an off-line switched power supply, controllable between an "on" state and an "off" state, which provides a shared direct current (DC) output from an alternating current (AC) source when in the "on" state;
a plurality of pocket circuits, each pocket circuit having a DC regulator, a charge controller, and a battery detect circuit, each charge controller having an "on" state and an "off" state and which is configured to recharge a rechargeable battery from the shared DC output of the off-line switched power supply when in the "on" state, each battery detect circuit operable to detect the presence of the rechargeable battery being coupled to the charging circuit and provide a battery detect signal while the rechargeable battery is present;
an ultra-low power management circuit, operable in either an active state or a sleep state, and which remains in the sleep state in the absence of any battery detect signal and operates in the active state responsive to at least one battery detect signal, and which enables the off-line switched power supply to the "on" state and the charge controller of each pocket circuit corresponding to the at least one battery detect signal to the "on" state when in the active state; and
an ultra-low power auxiliary power supply which provides power from the AC source to the battery detect circuit of each pocket circuit to detect the presence of the rechargeable battery and to the ultra-low power management circuit, which responsive to the detection of the rechargeable battery by at least one battery detect circuit, enters an active state and enables the off-line switched power supply to the "on" state and the charge controller of each pocket circuit corresponding to the at least one battery detect circuit to the "on" state.

15. The multi-pocket battery charger of claim 14, wherein the DC regulator is a step down buck converter.

16. A power control circuit, comprising:
an off-line switched power converter controllable to either an "on" state or an "off" state responsive to a switch signal and having a transformer defining a primary side and a secondary side, the primary side configured to couple to an AC source and having a feedback receiving circuit which receives feedback from the secondary side, the secondary side configured to provide electrical output to a removable load when the off-line switching power converter is operated in the "on" state;
a regulator circuit on the secondary side of the off-line switched power converter which is controllable to either an "on" state or an "off" state responsive to an enable signal and which provides the feedback to the feedback receiving circuit to regulate the electrical output when in the "on" state;
an ultra-low power inverter having a primary side on the secondary side of the off-line switched power converter and a secondary side on the primary side of the off-line switched power converter, the ultra-low power inverter controllable to either an "on" state or an "off" state responsive to an enable signal and providing the switch signal to the off-line switched power converter when in the "on" state;
a load detection circuit on the secondary side of the off-line switched power converter responsive to the presence of the removable load and providing a load present signal when the removable load is present;
an ultra-low power management circuit on the secondary side of the off-line switched power converter controllable to either an "on" state or an "off" state responsive to the load present signal and configured to provide the enable signal to the regulator circuit and ultra-low power inverter upon turning on; and
an ultra-low power auxiliary power supply having a primary side coupled to the AC source and a secondary side which provides power to the regulator circuit, ultra-low inverter, load detection circuit, and ultra-low power management circuit.

17. The power control circuit of claim 16, wherein the removable load is a rechargeable battery, the regulator circuit is a charge regulator circuit which controls the electrical output of the off-line switched power converter to recharge the rechargeable battery according to a charge regime.

18. The power control circuit of claim 16, wherein the primary side of the off-line switched power converter comprises
a rectifier bridge which rectifies AC from the AC source and provides a positive and a negative output;
a bulk filter capacitor and a switching control circuit coupled between the positive output of the rectifier bridge and a common node; and
a switch transistor coupled between the common node and the negative output of the rectifier bridge and having a gate coupled to the secondary side of the ultra-low power inverter to receive the switch signal and electrically coupled the common node to the negative output of the rectifier bridge when the switch signal is present, and decouple the common node from the negative output of the rectifier bridge otherwise.

19. The power control circuit of claim 18, wherein the switch signal output from the secondary side of the ultra-low power inverter further biases the feedback circuit on the primary side through a blocking diode.

20. The power supply arrangement of claim 1, wherein the management circuit enters a substantially "off" state and causes the DC regulator circuit and the off-line switched power supply to each enter a substantially "off" state upon removal of the removable load.

\* \* \* \* \*

UNITED STATES PATENT AND TRADEMARK OFFICE
CERTIFICATE OF CORRECTION

| | | |
|---|---|---|
| PATENT NO. | : 8,659,263 B2 | Page 1 of 1 |
| APPLICATION NO. | : 12/959585 | |
| DATED | : February 25, 2014 | |
| INVENTOR(S) | : Oglesbee et al. | |

It is certified that error appears in the above-identified patent and that said Letters Patent is hereby corrected as shown below:

In the claims

In Column 10, Line 23, in Claim 1, delete "the the" and insert -- the --, therefor.

In Column 10, Line 25, in Claim 1, delete "which responsive" and insert -- which is responsive --, therefor.

In Column 11, Line 60, in Claim 14, delete "which responsive" and insert -- which is responsive --, therefor.

In Column 12, Lines 48-49, in Claim 18, delete "comprises" and insert -- comprises: --, therefor.

Signed and Sealed this
Third Day of May, 2016

Michelle K. Lee
*Director of the United States Patent and Trademark Office*